United States Patent
Bastawala et al.

(10) Patent No.: US 6,973,457 B1
(45) Date of Patent: Dec. 6, 2005

(54) METHOD AND SYSTEM FOR SCROLLABLE CURSORS

(75) Inventors: Mehul Bastawala, Menlo Park, CA (US); Sreenivas Gollapudi, Cupertino, CA (US); Lakshminarayanan Chidambaran, Fremont, CA (US); Srinath Krishnaswamy, Fremont, CA (US)

(73) Assignee: Oracle International Corporation, Redwood shores, CA (US)

( * ) Notice: Subject to any disclaimer, the term of this patent is extended or adjusted under 35 U.S.C. 154(b) by 508 days.

(21) Appl. No.: 10/144,665

(22) Filed: May 10, 2002

(51) Int. Cl.[7] ............................................. G06F 17/30
(52) U.S. Cl. ........................ 707/10; 707/3; 707/101; 707/102; 707/104
(58) Field of Search ........................ 707/2, 3, 7, 10, 707/1, 203, 205, 101, 102, 103, 104; 715/26; 709/224, 200

(56) References Cited

U.S. PATENT DOCUMENTS

| | | | |
|---|---|---|---|
| 4,803,613 A | 2/1989 | Kametani et al. | |
| 4,905,138 A | 2/1990 | Bourne | |
| 5,175,856 A | 12/1992 | Van Dyke et al. | |
| 5,241,648 A | 8/1993 | Cheng et al. | |
| 5,303,149 A | 4/1994 | Janigian | |
| 5,305,389 A | 4/1994 | Palmer | |
| 5,408,630 A | 4/1995 | Moss | |
| 5,410,698 A | 4/1995 | Danneels et al. | |
| 5,499,355 A | 3/1996 | Krishnamohan et al. | |
| 5,600,316 A | 2/1997 | Moll | |
| 5,632,015 A | 5/1997 | Zimowski et al. | |
| 5,724,588 A | 3/1998 | Hill et al. | |
| 5,754,771 A | 5/1998 | Epperson et al. | |
| 5,765,159 A | 6/1998 | Srinivasan | |
| 5,787,461 A | 7/1998 | Stephens | |
| 5,797,001 A | 8/1998 | Augenbraun et al. | |
| 5,799,302 A | 8/1998 | Johnson et al. | |
| 5,802,528 A | 9/1998 | Oki et al. | |
| 5,802,569 A | 9/1998 | Genduso et al. | |
| 5,812,527 A | 9/1998 | Kline et al. | |
| 5,812,852 A | 9/1998 | Poulsen et al. | |
| 5,813,000 A | 9/1998 | Furlani | |
| 5,815,718 A | 9/1998 | Tock | |
| 5,819,268 A | 10/1998 | Hackett | |
| 5,822,749 A | 10/1998 | Agarwal | |
| 5,822,790 A | 10/1998 | Mehrotra | |
| 5,826,253 A * | 10/1998 | Bredenberg | 707/2 |
| 5,832,231 A | 11/1998 | Raman et al. | |
| 5,835,904 A | 11/1998 | Vicik et al. | |

(Continued)

OTHER PUBLICATIONS

Padmanabhan et al. "Using Predictive Prefetching to Improve World Wide Web Latency" *Proceedings of the ACM SIGCOMM '96 Conference* (1996) pp. 1-15.

Primary Examiner—Thuy N. Pardo
(74) Attorney, Agent, or Firm—Bingham McCutchen LLP

(57) ABSTRACT

A method and system for implementing scrollable cursors is described. A multi-tier caching structure is maintained, in which a partial result set is cached at the client computer and a more-complete result set is cached at the server computer. If the cursor is scrolled in either the forward or backward directions, the partial result set cached at the client computer is first checked to see if requested data is present. If so, then the requested data is fetched from the client cache and the current position of the cursor is moved to the appropriate position in the result set. If the requested data is not present in the client cache, then those data items are fetched from the cache at the server computer.

37 Claims, 7 Drawing Sheets

U.S. PATENT DOCUMENTS

| | | |
|---|---|---|
| 5,913,208 A | 6/1999 | Brown et al. |
| 5,930,795 A | 7/1999 | Chen et al. |
| 5,937,415 A | 8/1999 | Sheffield et al. |
| 5,937,421 A * | 8/1999 | Petrov et al. ............... 715/526 |
| 5,958,040 A | 9/1999 | Jouppi |
| 6,009,265 A | 12/1999 | Huang et al. |
| 6,052,699 A | 4/2000 | Huelsbergen et al. |
| 6,098,064 A | 8/2000 | Pirolli et al. |
| 6,112,197 A | 8/2000 | Chatterjee et al. |
| 6,112,209 A | 8/2000 | Gusack et al. |
| 6,178,461 B1 | 1/2001 | Chan et al. |
| 6,341,288 B1 | 1/2002 | Yach et al. |
| 6,401,193 B1 | 6/2002 | Afsar et al. |
| 6,421,342 B1 | 7/2002 | Schwartz et al. |
| 6,421,715 B1 | 7/2002 | Chatterjee et al. |
| 6,463,508 B1 | 10/2002 | Wolf et al. |
| 6,484,179 B1 | 11/2002 | Roccaforte |
| 6,513,108 B1 | 1/2003 | Kerr et al. |
| 6,557,079 B1 | 4/2003 | Mason, Jr. et al. |
| 6,598,037 B1 * | 7/2003 | Craig et al. .................... 707/1 |
| 6,662,218 B2 | 12/2003 | Mighdoll et al. |
| 6,675,195 B1 | 1/2004 | Chatterjee et al. |
| 6,701,520 B1 | 3/2004 | Santosuosso et al. |
| 6,763,382 B1 * | 7/2004 | Balakrishnan et al. ...... 709/224 |
| 2001/0003823 A1 * | 6/2001 | Mighdoll et al. ........... 709/200 |
| 2001/0013045 A1 | 8/2001 | Loschky et al. |
| 2001/0051956 A1 * | 12/2001 | Bird .......................... 707/203 |
| 2002/0099806 A1 | 7/2002 | Balsamo et al. |
| 2002/0143728 A1 * | 10/2002 | Cotner et al. .................. 707/1 |
| 2002/0194174 A1 | 12/2002 | Calkins et al. |

* cited by examiner

METHOD AND SYSTEM FOR SCROLLABLE CURSORS

BACKGROUND AND SUMMARY

Many operations performed on information in a database system are executed using database query language statements, such as statements in the structured query language (SQL). SQL is a non-procedural language for accessing and manipulating data in a relational or object-relational database. Procedural languages, such as PL/SQL, may also be used to perform operations in a database system. For purpose of illustration, and not by way of limitation, the rest of this document will be explained with reference to SQL statements and relational database structures such as tables and rows. It is noted, however, that the inventive concepts disclosed herein are applicable to other types of objects, structures, and operations in a database.

A cursor is a handle to a query execution area, e.g., an area in memory in which a parsed SQL statement and other information for processing the SQL statement is stored. In many database systems, a cursor is an available resource for accessing or parsing SQL statements embedded within an application. Cursors enable a SQL statement to retrieve rows from a database table into a given result set, which can then be accessed, displayed, or operated upon.

Typically, a defined sequence of actions is performed to execute a SQL query statement. To execute a SQL query statement, the cursor is first created, either in conjunction with the SQL query or independently. The cursor may be automatically handled by the database system, or manually controlled by a programmer through an application programming interface. The SQL statement is thereafter parsed, optimized, and executed to produce a set of rows called the result set. The rows in the result set are retrieved ("fetched") either a row at a time or in groups. The cursor can be considered the database query and its result set. A final stage for processing the SQL query statement is to close the cursor.

A cursor can often be utilized like a pointer to a specific row in a result set. When the cursor is active, operations can be performed against the specific row or group of rows at which the cursor is pointing. Traditionally, the only allowed movement of the cursor was sequential, starting at the first row retrieved by the query expression and ending with the last row. Each row of data in this approach is fetched, operated upon, and then released in sequential order. This was the approach adopted by the SQL-86 and SQL-89 standards.

The SQL-92 standard describes a type of cursor that can be scrolled in the forward direction. This permits rows in the result to be fetched out-of-order in the forward direction. A recent advance is the backwards scrollable cursor (SQL-99 standard), which allows movement of the cursor in either the forward and backward directions, thereby permitting rows to be accessed in any order. In this approach, the cursor can be moved in any direction to access a row of data, even for data that was earlier fetched. For example, Microsoft Corporation provides an ODBC cursor library for the SQL Server product that allows backward scrolling of a cursor. However, to allow backward scrolling, this approach requires the entire contents of the result set to be cached at the client computer. The drawback is that since the entire result set is cached at the client computer, a large amount of memory is consumed and performance speed is reduced to allow the backward scrolling functionality. This memory overhead can significantly affect performance and scalability at the client computer.

The present invention provides an improved method and system for implementing scrollable cursors. In an embodiment, a multi-tier caching structure is maintained, in which a partial result set is cached at the client computer and a more-complete result set is cached at the server computer. If the cursor is scrolled in either the forward or backward directions, the partial result set cached at the client computer is first checked to see if requested data is present. If so, then the requested data is fetched from the client cache and the current position of the cursor is moved to the appropriate position in the result set. If the requested data is not present in the client cache, then those data items are fetched from the cache at the server computer. In one embodiment, the server computer is itself a client for another server computer, in which each server computer maintains a cache to store a full and/or partial result set. An indefinitely long chain of server devices can be maintained, corresponding to a chain of caches for storing full or partial result sets.

Further details of aspects, objects, and advantages of the invention are described in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION OF EMBODIMENT(S)

Figure 1A:
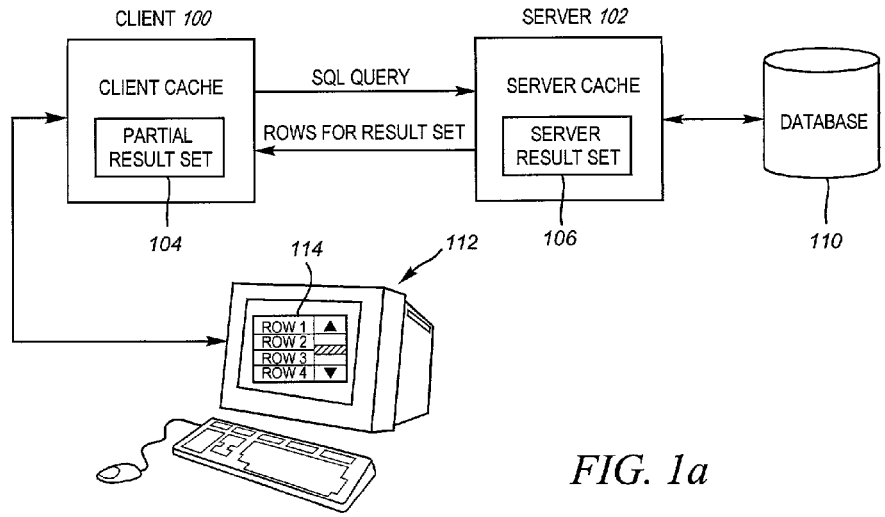
FIG. 1a depicts an architecture for implementing scrollable cursors according to an embodiment of the invention.

The present invention provides an improved method and system for implementing scrollable cursors. According to an embodiment of the invention, a scrollable cursor is implemented using multiple levels of caching to store a result set from a SQL operation. FIG. 1a shows an architecture for implementing scrollable cursors according to one embodiment of the invention. In the system shown in FIG. 1a, a user at a client computer 100 initiates a SQL query that is executed at a server 102. The server 102 accesses a database 110 to retrieve data responsive to the SQL query. A server cache 106 stores a result set for the query. As rows are sent from the server 102 to client 100, rows from the result set are also locally cached in client cache 104. In one embodiment, the server cache 106 stores at least all the rows seen by the client computer 100. Some or all of the result set may be cached in client cache 104, depending upon the size of client cache 104 and the amount of data in the result set. If the result set is sufficiently large, then only a portion of the result set is cached in client cache 104. Similarly, some or all of the result set may be cached in server cache 106. In an embodiment, server cache 106 is configured to be significantly larger than the client cache. Thus, depending upon the size of the server cache 106 and any particular result set, it is contemplated that the server cache 106 may be configured to store an entire result set. Alternatively, server cache 106 may also be configured to store only a portion of a result set on an as-needed basis.

According to an embodiment, a scrollable cursor provides support for forward and backward access into a result set from a given current position, using either absolute or relative row number offsets into the result set. Consider if the user views the result set in a scrollable window 114 at client display 112, in which scrolling the display window causes a corresponding movement for the cursor position. This type of situation exists, for example, in systems configured to conserve network bandwidth by allowing request and transmission of only enough information to be sent that can fit onto a client's display device, page, window, or screen at a particular instance in time. In these systems, additional portions of the requested data are retrieved only if specifically requested, e.g., based upon the user scrolling or paging through the data displayed in the display window.

When the user at client 100 accesses the result set, the current position of the cursor points at a row or set of rows in the result set. In one embodiment, the current position points at the last row fetched by the client in the fetch call. In practice, this may result from the user viewing that particular row or set of rows on the scrollable display window 114. There may be additional rows of data in the result set both before and after the current cursor position. The cursor is scrolled in the backward direction to view rows in the result set from before the current position. The cursor is scrolled in the forward direction to view rows in the result set after the current position. It is noted that scrolling a display window is only one of many possible ways to scroll a cursor; another possible approach to make explicit API calls to a database to reposition the cursor.

Figure 1B:
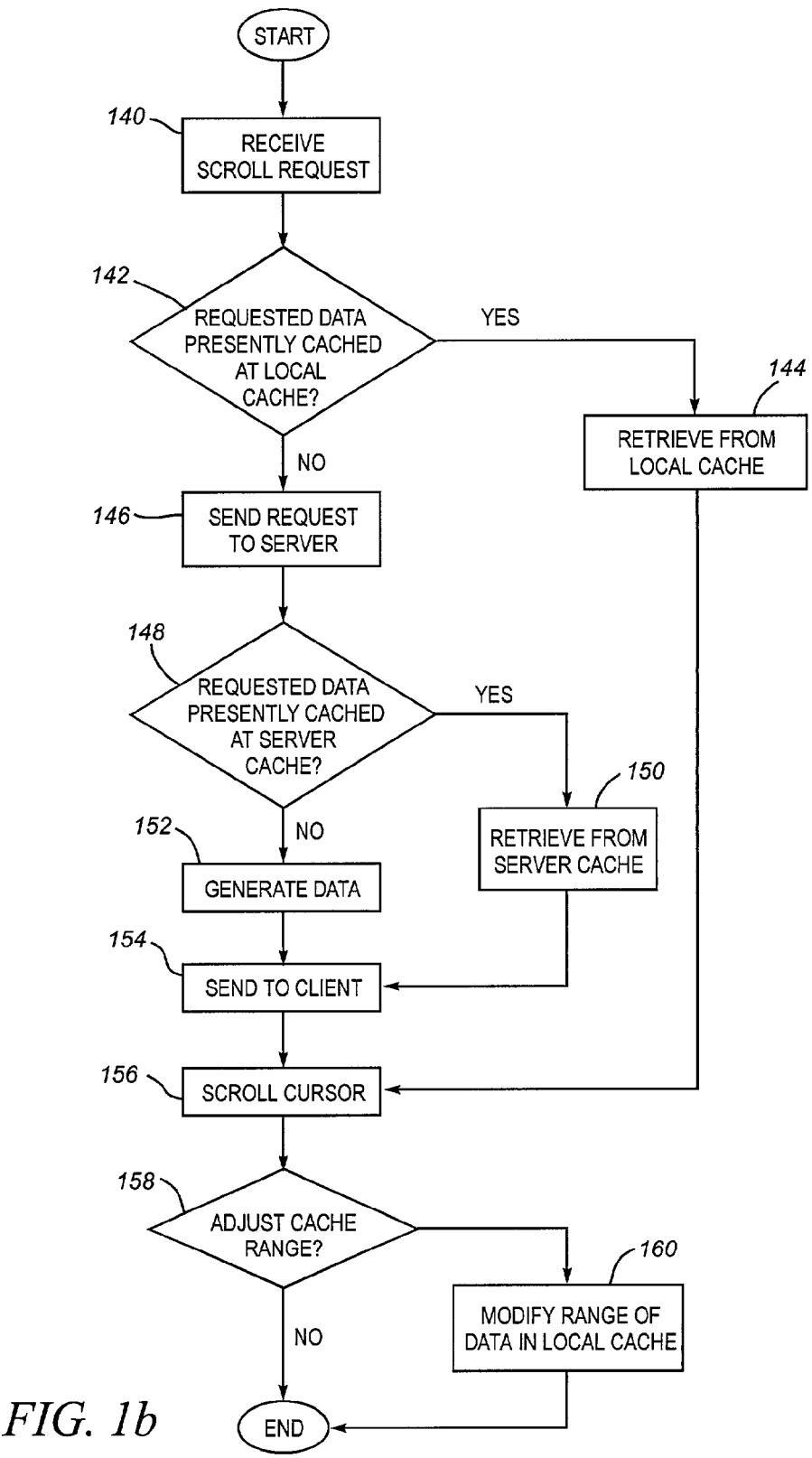
FIG. 1b is a flowchart of a process for scrolling a cursor according to an embodiment of the invention.

FIG. 1*b* depicts a flowchart of a process for scrolling a cursor according to one embodiment of the invention. At step 140, a request to scroll the cursor is received. If the cursor is being scrolled in either the forward or backward direction, the client cache 104 is checked to determine if it contains the rows of data from the result set at the desired cursor position (step 142). If so, then the cursor is scrolled to the designated position and the corresponding row or set of rows is retrieved from client cache 104 and displayed at the scrollable display window 114 (step 144). If the client cache 104 does not contain the appropriate data, then a fetch request is sent to the server (step 146). At step 148, a determination is made whether the requested rows of data exist in the server cache 106. If so, then the rows are retrieved from the server cache (step 150), and returned to the client (step 154). If not, then the server will generate the data (step 152) before sending it to the client (step 154). A determination can also be made whether to shift the range of rows maintained in cache in response to the scroll request (step 158). If the row range is modified, then in an embodiment, the entire set of rows in cache is replaced with a new partial result set (step 160). Alternatively, only individual rows of data are replaced in cache to shift the cache range.

The advantage of the present approach is that scrollable cursors are enabled while locally caching only a partial result set at the client device 100. If the partial result set in the client cache 104 contains rows of data from before and after the current cursor position, both forward and backward scrolling can be immediately satisfied for the locally cached data without requiring the overhead of sending/receiving roundtrip messages between the client 100 and server 102 to fetch additional rows of data. Additional rows of data are fetched from server 102 only if the appropriate rows of data from the result set are not presently cached in client cache 104. Since the server 102 also maintains a full cache for the result, the required rows from the result set can be immediately transmitted to the client, without requiring re-execution of the query to generate data that was previously provided to the client 100. This is in contrast to database systems that discard data at the server 102 after it has been sent to the client 100.

Because memory usage is reduced using the present invention, scrollable cursors are enabled for objects that may require greater memory consumption requirements. For example, many types of complex data objects and user-defined datatypes cause rows in a result set to be significantly larger than for more typical data objects. Under these circumstances, it is impractical to enable scrollable cursors by storing an entire result set into client-side memory. However, the present invention can be utilized to enable scrollable cursors by caching only a portion of the result set in local memory at client cache 104, with the rest of the result cache remotely cached at the server.

The amount of data to locally store in client cache 104 is subject to design choice. One factor that can be used to limit or control the amount of data to store in client cache 104 is to set a maximum number of rows for client cache 104. Another approach is to limit the amount of memory that can be used in the client cache 104 to store the partial result set. A combination of these two factors can be used to decide upon the contents of the local client cache 104.

In one embodiment of the invention, the quantity of data to cache at the server 102 is also subject to variation. Because of the memory consumption burdens that may be imposed if the entire result set is stored at the server cache 106, the system can be configured to store only a portion of the result set at the server 102. Heuristics may be employed to determine the exact portion of the result set that should be cached at server 102, rather than being discarded. A distribution plan can be implemented to coordinate storing the portion of the result set that is located at the client side versus the portion that is located at the server side. This allows specific partitioning of the result set, e.g., based upon percentage of the entire result set, that should be stored at the various cache locations.

In yet another embodiment, the invention may be configured to entirely discard data at the server once it has been sent to the client 100, thereby not caching any portion of the result set at the server 102. This approach may be taken, for example, if the entire result set fits into the allotted space for storing rows in the client cache 104. It is noted, however, that if data corresponding to a scrolled cursor position is not located in either the client cache 104 or server cache 106, then that portion of the result set may have to be re-generated by the SQL execution engine before being fetched, creating additional levels of delay and overhead.

Figure 2A:
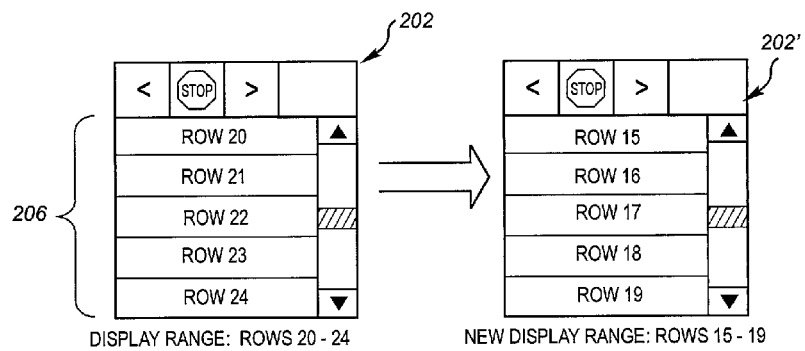
FIGS. 2a, 2b, 3a, 3b, 4a, 4b, 5a, and 5b depict example scenarios for scrolling a cursor according to an embodiment of the invention.
Figure 2B:
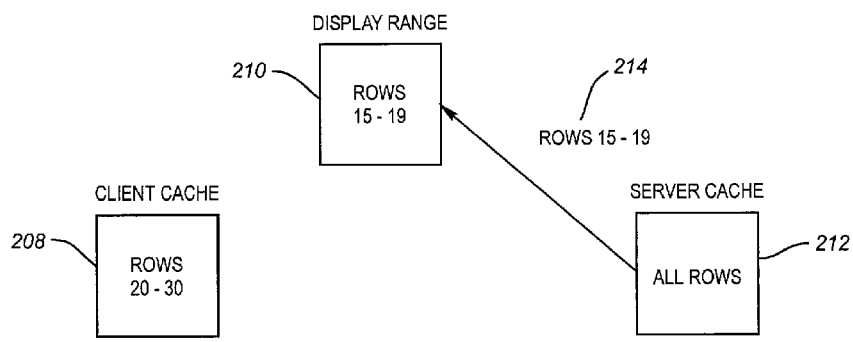

FIGS. 2*a* and 2*b* depict a first example scenario for scrolling a cursor according to an embodiment of the invention. FIG. 2*a* shows a display window 202 that is presently displaying rows 20 to 24 in a query result set. Based upon the present cursor position, the client cache 208 presently contains rows 20 to 30 of the result set as shown in FIG. 2*b*. Consider if the user decides to backward scroll the display window, and hence backward scroll the cursor, such that rows 15 to 19 of the result set are displayed (as shown in modified display window 202').

As previously noted, the client cache 208 only contains rows 20 to 30 of the result set. Here, the display range 210 corresponding to the new cursor position (rows 15 to 19) falls outside the set of rows that are locally cached in client cache 208. Therefore, rows 15 to 19 must be fetched from the server before the cursor is scrolled to the appropriate position in the result set. Since the entire result set is already cached at the server cache 212, the specified rows 214 can be immediately sent from the server to the client without regenerating the data.

Figure 3A:
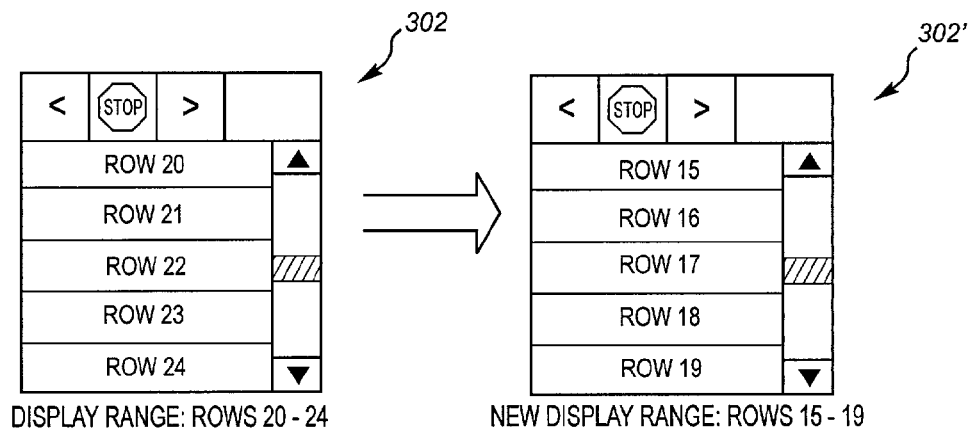
Figure 3B:
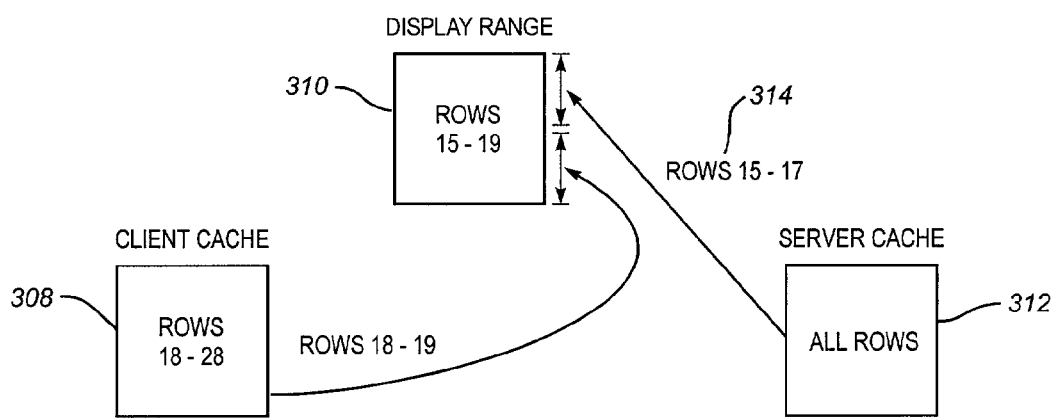

FIGS. 3a and 3b depict a second example scenario for scrolling a cursor according to an embodiment of the invention. FIG. 3a shows a display window 302 that is presently displaying rows 20 to 24 in a query result set. Based upon the present cursor position, the client cache 308 presently contains rows 18 to 28 of the result set as shown in FIG. 3b. Consider if the user decides to backward scroll the display window, and hence backward scroll the cursor, such that rows 15 to 19 of the result set are displayed (as shown in display window 302').

In this example, the client cache 308 contains rows 18 to 28 of the result set. The display range 310 corresponding to the new cursor position (rows 15 to 19) partially overlaps the set of rows that is locally cached in client cache 308. In particular, rows 15 to 17 of the result set to be displayed are not locally cached at client cache 308, while rows 18 and 19 from display range 310 are locally cached. Therefore, rows 18 and 19 do not have to be fetched from the server since they already exist in the local cache. However, rows 15 to 17 must be fetched from the server before the cursor is scrolled to the appropriate position in the result set. Since the entire result set is already cached at the server cache 312, the specified rows 314 can be immediately sent from the server to the client, without re-generating the data.

Figure 4A:
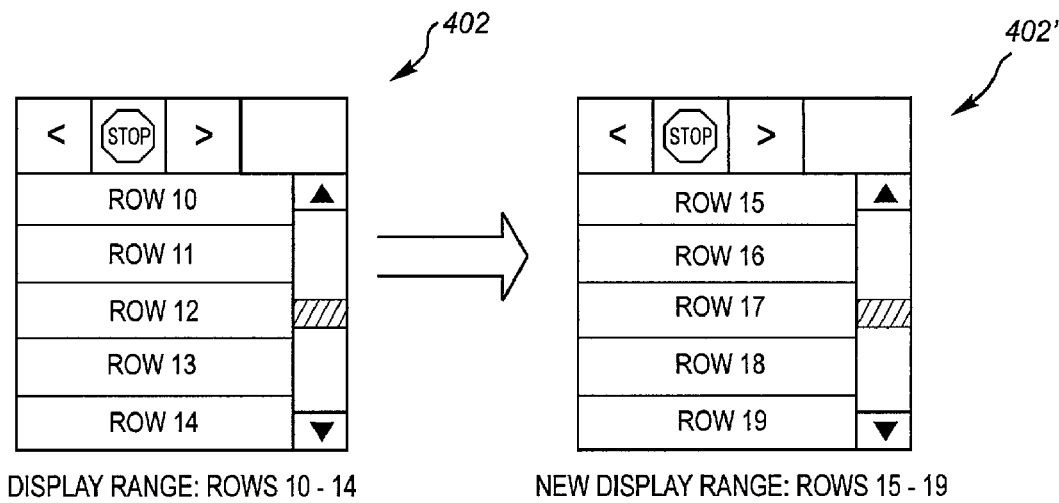
Figure 4B:
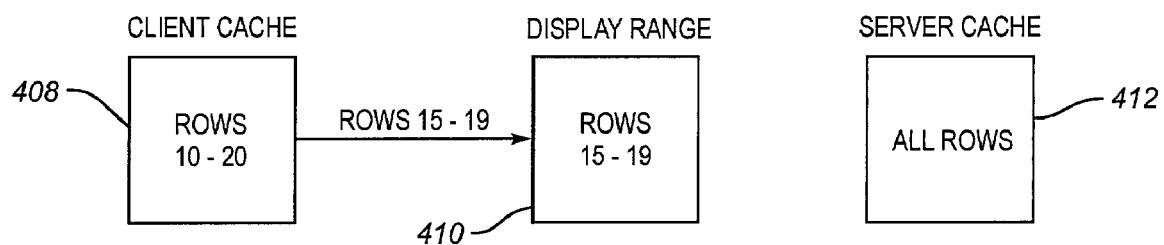

FIGS. 4a and 4b depict a third example scenario for scrolling a cursor according to an embodiment of the invention. FIG. 4a shows a display window 402 that is presently displaying rows 10 to 14 in a query result set. Based upon the present cursor position, the client cache 408 presently contains rows 10 to 20 of the result set as shown in FIG. 4b. Consider if the user decides to forward scroll the display window, and hence froward scroll the cursor, such that rows 15 to 19 of the result set are displayed (as shown in modified display window 402').

The client cache 408 presently contains rows 10 to 20 of the result set, as shown in FIG. 4b. Here, the display range 410 corresponding to the new cursor position (rows 15 to 19) completely overlaps the set of rows that is locally cached in client cache 408. Therefore, the cursor position can be immediately re-positioned relative to the current position, as appropriate, to form the display range 410 and the modified display window 402'. Since the client cache 408 currently includes all of the rows in the result set necessary to scroll the cursor, no additional rows need to be fetched from the server cache 412.

Figure 5A:
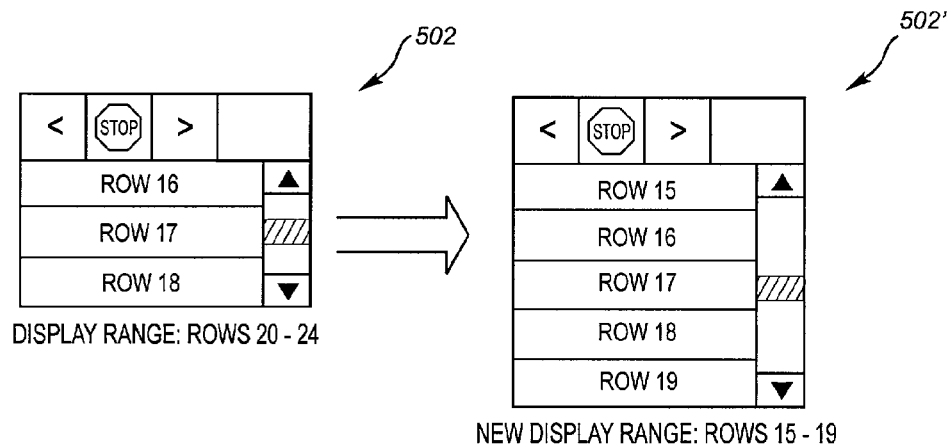
Figure 5B:
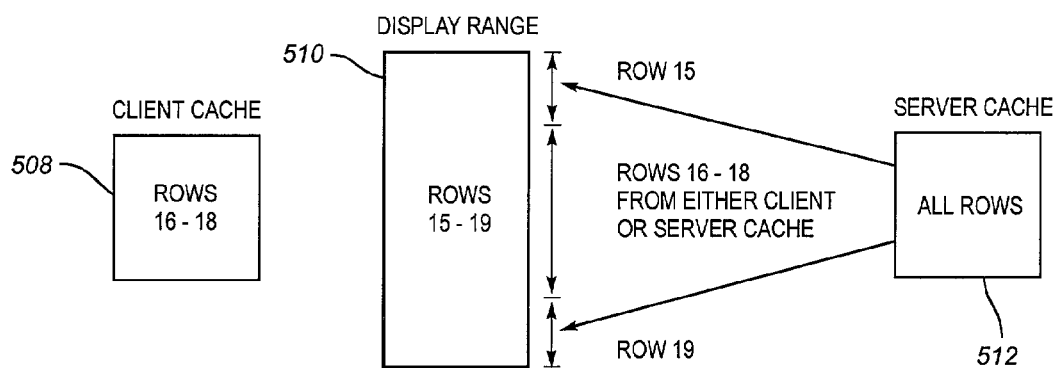

FIGS. 5a and 5b depict a fourth example scenario for scrolling a cursor according to an embodiment of the invention. FIG. 5a shows a display window 502 that is presently displaying rows 16 to 18 in a query result set. Based upon the present cursor position, the client cache 508 presently contains rows 16 to 18 of the result set as shown in FIG. 5b. Consider if the user decides to scroll and resize the display window, and hence scroll the cursor, such that rows 15 to 19 of the result set are displayed (as shown in modified display window 502'). Here, it appears that we are scrolling in both the forward and backward directions at the same time.

In this example, the client cache 508 contains rows 16 to 18 of the result set, as previously indicated. The display range 510 corresponding to the new cursor position (rows 15 to 19) partially overlaps the set of rows that is locally cached in client cache 508. In particular, row 15 and row 19 of the result set to be displayed are not locally cached at client cache 308, while rows 16 to 18 are locally cached. Therefore, rows 15 and 19 are fetched from the server before the cursor is scrolled to the appropriate position in the result set. If the entire result set is already cached at the server cache 512, then the specified rows 15 and 19 can be immediately sent from the server to the client. If either row 15 or row 19 do not exist in the server cache 512, e.g., because they have not previously been fetched or server-side cache logic discarded these rows, then the missing row will be generated before being sent to the client.

In this scenario, it can be seen that the display range 510 completely envelops the set of rows in the client cache 508, such that rows from both before and after the rows in the client cache 508 must be fetched from the server before the cursor can be re-positioned. A first approach to handle this situation is to issue two separate fetch statements to the server, with a first fetch to retrieve the rows corresponding to the missing row from before the cache range (row 15) and second fetch to retrieve the missing row from after the cache range (row 19). A second approach is to issue a single fetch command to retrieve all the rows in the display range, including the rows that already exist in the local client cache 508. The advantage of the first approach is that since rows 16–18 are not being fetched, less data is transmitted over the network from the server to the client than occurs in the second approach. The disadvantage of the first approach is that two separate fetch commands are issued as opposed to the single fetch command for the second approach, which may result in more roundtrip messaging. Variable system conditions, such as the amount of network traffic, amount of data to retrieve for each approach, the amount of exact fetch commands needed, and the exact quantity of data already cached, will determine which approach provides the greatest benefits.

The range of rows to locally cache at client 100 may be modified, e.g., if a cache miss occurs. Various approaches may be employed to determine the range of rows to keep in local cache 104. One approach is to anticipate the possibility that a user will always seek to scroll forward or backward from a current cursor position by a given offset. Under this approach, the ideal range of rows in the local client cache 104 will extend from the current cursor position and extend at least as far as the anticipated offset in both the forward and backward direction, within the size limitations of the local cache. Another approach assumes that it is more likely that the user will scroll in the forward direction. Under this approach, the range of rows to keep in the local cache will ideally extend at least in the forward direction from the current cursor position. Under either approach, prefetching can be used to retrieve rows of data into client cache 104, as described in more detail below.

In a scrollable display window, a vertical scrollbar may exist along an outer edge of the display window. Within the scrollbar is a tab that indicates the relative position of the display within the entire result set. In addition, the size of the tab is often configured to reflect the relative size of the display window compared to the entire result set. In conventional systems, two separate operations are typically performed to obtain the relevant information needed to size and position a scrollbar tab. A first SQL statement is used to obtain the size (number of rows) of the result set (e.g., "count *") and a second SQL statement is used to actually retrieve the rows in the result set (e.g., "select *"). Using the present invention, only a single operation is required, since the entire result set is being cached at the server cache 106. Here, only the operation to retrieve the rows is needed. Once the rows have been cached, the cursor can be positioned at the final row in the result set. By identifying the cursor position at the last row, the count of the number of rows can be inherently made, without performing a separate SQL operation upon the result set. The semantics of the fetching could be either a set of rows or just the last N rows of the result set.

At the server 102, the rows of the result set can be maintained in a manner that optimizes use of secondary storage. In an embodiment, when the row data overflows from the cache at server 102, the overflow data is stored in temporary LOBs (large objects that use temporary segments) on disk which do not incur transactional overhead such as redo and undo logging or minimizes the use of such transaction logging. In one embodiment, the duration of this storage is only until the cursor is active on the client. In an embodiment, a B-tree index is employed to track the information stored on the temporary LOBs. If the B-tree index overflows to disk, then the index information can itself be maintained in their own temporary segments.

Figure 6:
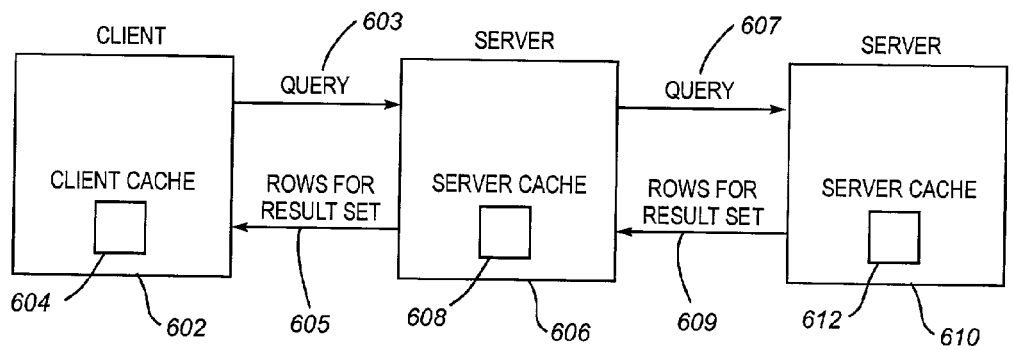
FIG. 6 depicts an architecture for multi-level n-node caching according to an embodiment of the invention.

FIG. 6 shows an architecture for implementing distributed database query processing, e.g., remote mapped queries, with scrollable cursors according to one embodiment of the invention. This may involve a query in which data that is accessed to respond to the query exists at a remote location. To illustrate distributed database query processing with remote mapped queries according to an embodiment of the invention, shown in FIG. 6 is a client device 602, a first server 606, and a second server 610. A client cache 604 may exist to locally cache rows for a result set 605 that is returned to the client 602 from first server 606. The first server 606 and second server 610 may each maintain its own cache 608 and 612, respectively, to locally cache data.

Consider the following query, in which first server 606 issues its own query 607 to second server 610 in response to receiving query 603 from client 602:

SELECT *
FROM table_at_server_606 A
WHERE EXISTS (SELECT * from table_at_server_610 B
WHERE A.value=B.value);

In an embodiment of the invention, this type of query can be satisfied by either moving the cursor to where the data is located or by moving the data to where the cursor is located. Various efficiency measures may be considered in determining whether the data or the query should be sent to a remote location, e.g., network efficiency or cache usage measures. For example, if the volume of data to be evaluated by the query is much smaller at first server 606 than at second server 610, it is likely to be more efficient to send the query and the data from first server 606 to the second server 610 for processing. On the other hand, if the volume of data is much greater at first server 606, then it is likely more efficient to send the data to be considered from second server 610 to first server 606 to process the query.

In the embodiment of the invention shown in FIG. 6, first server 606 requires access to data from second server 610 to process query 603. If the query is to be processed at second server 610 (i.e., a corresponding query 607 is sent from first server 606 to second server 610), then first server 606 essentially becomes a client to second server 610. It is noted that second server 610 may itself seek to remotely map a query to another server to process the query, which remotely maps the query to another server, etc., in an indefinite chain of remotely mapped queries. When processing remote query 607, rows of result set 609 are sent from second server 610 to first server 606. The rows in result set 609 are ultimately sent to client 602 as part of result set 605, with additional sorting, ordering, or processing possibly being performed at first server 606 depending upon the exact requirements of query 603. Therefore, it is very possible that the fetch commands issued to retrieve rows in result set 605 will cause corresponding fetch commands sent to second server 610 to retrieve rows in result set 609. These fetch commands may occur as a result of manipulating a scrollable cursor at client 602.

As noted in the previous section, scrollable cursors can be implemented with a two-level cache, in which a partial result set is stored at the client and a full or partial result set is stored at the server. In the example of FIG. 6, since first server 606 may become a client to second server 610, a similar multi-level caching arrangement may be implemented between these two servers. In particular, cache 608 at first server 606 is configured to store a portion of result set 609, while cache 612 at second server 610 is configured to store part or all of the result set 609.

If the cursor position is scrolled/moved at client 602 beyond the boundaries of cache 604, then a fetch command may be issued to server 606. If the fetch command and/or cursor scroll command extends beyond the data stored in cache 608 at first server 606, then first server 606 could issue another fetch command to second server 610. Since server second 610 maintains its own cache 612 for result set 609, the requested data can be immediately sent from second server 610 to first server 606. If query 607 causes second server 610 to issue a query against yet another server, then the above procedure is repeated to this additional server. Potentially, an indefinitely long chain of servers, queries, caches, and cursors could be linked together in this manner.

In one embodiment, cache 608 is used to store data for both result set 605 as well as result set 609. In an alternate embodiment, first server 606 maintains separate cache areas for these result sets 605 and 609.

Figure 7:
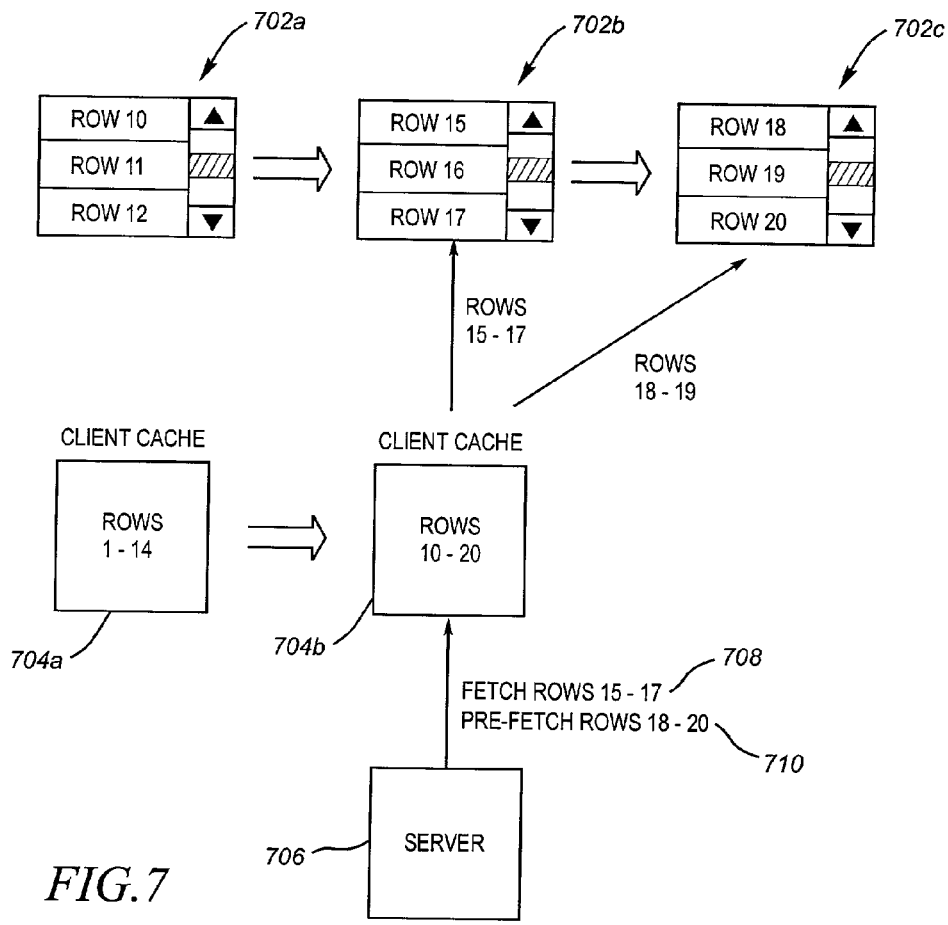
FIG. 7 shows multi-level caching in conjunction with prefetching according to an embodiment of the invention.

FIG. 7 shows an embodiment of the invention in which prefetching is utilized in combination with scrollable cursors. Prefetching refers to the action of transmitting information before it is immediately requested, based upon predictive selection of data anticipated to be requested by a client in the future. To illustrate this aspect of the invention, shown in FIG. 7 is a scrollable display window 702a. As before, it is assumed that scrolling through the displayed rows in display window 702a causes a corresponding movement of the cursor position for the query/result set associated with the display window 702a. At a given point in time, display window 702a displays rows 10 through 12 and its associated local client cache 704a contains rows 1 through 14.

Consider if the user desires to scroll forward through the contents of display window 702a such that rows 15–17 are displayed. Modified display window 702b depicts the effects of this scrolling operation through the result set, in which rows 15–17 are displayed. Internally, the cursor will attempt to move its current position by "fetching" to the appropriate position in the result set.

As before, the client device will first determine whether the client cache contains the appropriate rows from the result set that will allow the cursor to be re-positioned in the desired manner. Here, the client cache 704a does not presently contain the rows from the result set (rows 15–17) that would allow this scrolling operation to proceed. Hence, these needed rows 708 will be retrieved from the server. Once these rows are retrieved, they can be displayed in display window 702b and the cursor position can be moved to correspond to the new configuration of the display window 702b.

If prefetching is performed, then additional rows 710 are also retrieved or "prefetched" from the server, even if not explicitly requested at the present time. The rationale is that the present request for a portion of the result set results in a certain amount of overhead, including a given quantity of network roundtrips for the request from client to server as well as the data transmission from server to client. It can be anticipated that at a later point in time, the client will request another portion of the result set to be transmitted from server to client, resulting in further overhead to be expended. This process of making separate requests for data is inefficient if the overhead of separately requesting and sending data in multiple portions is higher than if the data is requested and sent at one time. Moreover, a delay in displaying data exists whenever a cache miss occurs, and this delay/cache miss can be avoided if the required data was already prefetched and stored in cache.

In the example of FIG. 7, it can be reasonably anticipated that after viewing rows 15–17, the user will scroll through to the next page of results to view rows 18–19, as shown in the modified display window 702c. Therefore, when fetching rows 15–17 (708) from the server, rows 18–20 (710) may also be prefetched from the server. These additional rows will be cached in modified client cache 704b. When the user eventually decides to view rows 18–19 in display window 702c, the cursor can be scrolled into the appropriate position and the requested rows immediately displayed, without incurring any additional delays or requiring any additional network roundtrips.

One approach to implement prefetching is to designate a "prefetch count" for a given connection or session from server to client. The prefetch count represents the number of additional rows of data to prefetch in response to an explicit fetch command. For example, if a prefetch count of one is established, then each request for a row from the server results in one additional row being returned, with the prefetched row being the row immediately following the explicitly requested row. If the prefetch count is set to 2, then each request for a row is increased by an additional 2 rows of data, etc. In an embodiment, the prefetch count is a tunable value that can be adjusted based upon current system and network conditions.

One approach for prefetching that can be advantageously used in conjunction with the present invention is disclosed in U.S. patent application Ser. No. 08/873,644, filed on Jun. 11, 1997, which is hereby incorporated by reference in its entirety. Other approaches to prefetching are described in U.S. application Ser. No. 10/144,083, entitled "METHOD AND MECHANISM FOR PIPELINED PREFETCHING", filed on even date herewith, which is incorporated herein by reference in their entirety.

System Architecture Overview

Figure 8:
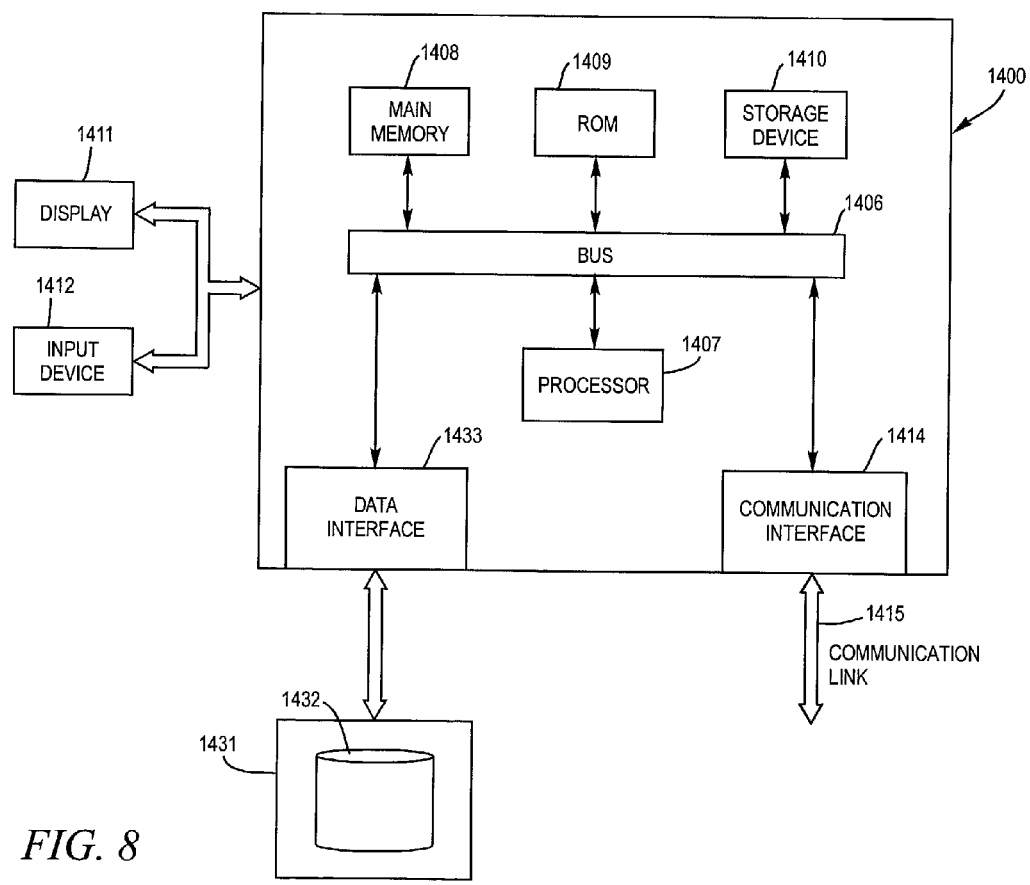
FIG. 8 is a diagram of a system architecture with which the present invention can be implemented.

The execution of the sequences of instructions required to practice the invention may be performed in embodiments of the invention by a computer system 1400 as shown in FIG. 8. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain 1, information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for scrolling a cursor in a database system, comprising:
    a) executing a query at a server to produce a result set;
    b) storing the result set at a first cache at the server;
    c) storing a portion of the result set at a second cache at a client;
    d) receiving a request to scroll a cursor from a current position to a different position within the result set;
    e) determining whether a data item corresponding to the different position within the result set exists in the second cache;
    f) if the data item corresponding to the different position within the result set exists in the second cache, then scrolling the cursor to the different position; and
    g) if the data item corresponding to the different position within the result set does not exist in the second cache, then fetching the data item from the result set at the first cache.

2. The method of claim 1 in which the first cache at the server maintains all of the result set.

3. The method of claim 1 in which the first cache maintains a portion of the result set.

4. The method of claim 1 in which the request to scroll the cursor is a backward scrolling request.

5. The method of claim 1 in which the result set comprises a user-defined datatype.

6. The method of claim 1 in which the second cache is limited in size based upon maximum number of rows.

7. The method of claim 1 in which the first cache is configured with objects not employing transaction overhead.

8. The method of claim 7 in which the objects comprise a temporary LOB.

9. The method of claim 8 in which the temporary LOB is associated with a LOB index to map storage locations.

10. The method of claim 8 in which the temporary LOB is associated with a mapping object to associate a portion of the result set with a LOB address.

11. The method of claim 7 in which the objects are configured without transaction logging.

12. The method of claim 1 wherein the request to scroll the cursor results in a distributed database query.

13. The method of claim 1 in which executing the query at the server involves data located at a second server.

14. The method of claim 13 in which the request is sent for processing to the second server.

15. The method of claim 13 in which the request is processed at the server and the data is sent from the second server to the server.

16. The method of claim 13 in which a determination of whether to send the request or data between the server and the second server is based upon distribution of data located between the server and the second server that is accessed by the query.

17. The method of claim 1 further comprising prefetching part of the result set to the second cache.

18. The method of claim 17 in which prefetching occurs based upon designating a prefetch count between the client and the server.

19. A system for scrolling a cursor in a database system, comprising:
    a) means for executing a query at a server to produce a result set;
    b) means for storing the result set at a server cache;
    c) means for storing a portion of the result set at a client cache;
    d) means for receiving a request to scroll a cursor from a current position to a new position within the result set;
    e) means for determining whether a data item corresponding to the new position within the result set exists in the client cache;
    f) means for determining if the data item corresponding to the new position within the result set exists in the client cache, and then scrolling the cursor to the new position if it exists; and
    g) means for determining if the data item corresponding to the new position within the result set does not exist in the client cache, and then fetching the data item from the result set at the server cache if it does not exist.

20. The system of claim 19 in which the first cache at the server maintains all of the result set.

21. The system of claim 19 in which the first cache maintains a portion of the result set.

22. The system of claim 19 in which the request to scroll the cursor is a backward scrolling request.

23. The system of claim 19 in which the result set comprises a user-defined datatype.

24. The system of claim 19 in which the second cache is limited in size based upon maximum number of rows.

25. The system of claim 19 in which the first cache is configured with objects not employing transaction overhead.

26. The system of claim 19, further comprising means for creating a distributed database query based on the received request.

27. The system of claim 19, in which the means for executing the query at the server uses data located at a second server.

28. The system of claim 19, further comprising means for prefetching part of the result set to the client cache.

29. A computer program product comprising a executable code to execute a process for scrolling a cursor in a database system, the process comprising the steps of:
   a) executing a query at a server to produce a result set;
   b) storing the result set at a server cache;
   c) storing a portion of the result set at a client cache;
   d) receiving a request to scroll a cursor from a current position to a new position within the result set;
   e) determining whether a data item corresponding to the new position within the result set exists in the client cache;
   f) if the data item corresponding to the new position within the result set exists in the client cache, then scrolling the cursor to the new position; and
   g) if the data item corresponding to the new position within the result set does not exist in the client cache, then fetching the data item from the server cache.

30. The computer program product of claim 29 in which the first cache at the server maintains all of the result set.

31. The computer program product of claim 29 in which the first cache maintains a portion of the result set.

32. The computer program product of claim 29 in which the request to scroll the cursor is a backward scrolling request.

33. The computer program product of claim 29 in which the result set comprises a user-defined datatype.

34. The computer program product of claim 29 in which the second cache is limited in size based upon maximum number of rows.

35. The computer program product of claim 29 in which the first cache is configured with objects not employing transaction overhead.

36. The computer program product of claim 29, wherein the request to scroll the cursor results in a distributed database query.

37. The computer program product of claim 29, wherein the process further comprises prefetching part of the result set to the client cache.

* * * * *